US012687981B2

(12) United States Patent
Muthiah et al.

(10) Patent No.: US 12,687,981 B2
(45) Date of Patent: Jul. 21, 2026

(54) KEY-GROUP BASED DATA MANAGEMENT IN KV SSD

(71) Applicant: Sandisk Technologies, Inc., Milpitas, CA (US)

(72) Inventors: Ramanathan Muthiah, Bangalore (IN); Ramkumar Ramamurthy, San Jose, CA (US)

(73) Assignee: Sandisk Technologies, Inc., Milpitas, CA (US)

( * ) Notice: Subject to any disclaimer, the term of this patent is extended or adjusted under 35 U.S.C. 154(b) by 8 days.

(21) Appl. No.: 18/480,671

(22) Filed: Oct. 4, 2023

(65) Prior Publication Data

US 2025/0117152 A1 Apr. 10, 2025

(51) Int. Cl.
*G06F 3/06* (2006.01)

(52) U.S. Cl.
CPC .......... *G06F 3/0652* (2013.01); *G06F 3/0619* (2013.01); *G06F 3/064* (2013.01); *G06F 3/0679* (2013.01)

(58) Field of Classification Search
CPC ...... G06F 3/0652; G06F 3/0619; G06F 3/064; G06F 3/0679
See application file for complete search history.

(56) References Cited

U.S. PATENT DOCUMENTS

| | | | |
|---|---|---|---|
| 8,738,861 B2 | 5/2014 | Bao et al. | |
| 9,971,526 B1 * | 5/2018 | Wei | ......................... G06F 3/064 |
| 10,769,064 B1 | 9/2020 | Twitto | |

| | | | |
|---|---|---|---|
| 11,327,891 B2 | 5/2022 | Park et al. | |
| 2009/0274364 A1 * | 11/2009 | Shakya | .................. G06V 20/40 |
| | | | 382/165 |
| 2009/0292862 A1 | 11/2009 | Kitahara | |
| 2015/0149870 A1 * | 5/2015 | Kozat | ................... H04L 1/0048 |
| | | | 714/772 |
| 2017/0116133 A1 * | 4/2017 | Kumar | ................ G06F 12/1027 |
| 2017/0147231 A1 | 5/2017 | Jung | |
| 2018/0048732 A1 | 2/2018 | Zhu et al. | |
| 2018/0173419 A1 * | 6/2018 | Dubeyko | .............. G06F 3/0688 |

(Continued)

FOREIGN PATENT DOCUMENTS

WO 2022-153024 A1 7/2022

OTHER PUBLICATIONS

International Search Report and Written Opinion for Application No. PCT/US2024/041427 dated Nov. 22, 2024.

(Continued)

*Primary Examiner* — Prasith Thammavong
(74) *Attorney, Agent, or Firm* — Patterson + Sheridan, LLP

(57) ABSTRACT

Instead of using trees to group key values (KV) based on KV information, use host provided information for grouping KVs. In the cases where the host provides KV information, the host determines how to group the information. The controller will then use the KV information to store the KV information in a group. The KVs can be sorted in the group by either size, length, type, etc. of the KV received from the host. Independent backend logic, such as data routing management, parity management, block management, and proactive data retrieval, is used to group KV information. Grouping the KV information using the independent backend logic will make garbage collection (GC) less difficult and increase retrieval performance due to the grouping of the KVs.

17 Claims, 7 Drawing Sheets

KV SSD

(56)  References Cited

U.S. PATENT DOCUMENTS

| 2018/0357234 | A1 |    | 12/2018 | De |  |
|---|---|---|---|---|---|
| 2019/0057140 | A1 | * | 2/2019 | Pitchumani | ........... G06F 3/0614 |
| 2022/0011948 | A1 |    | 1/2022 | Kang et al. |  |
| 2022/0269407 | A1 | * | 8/2022 | Wang | ................... G06F 3/0608 |

OTHER PUBLICATIONS

T. Bisson, K. Chen, C. Choi, V. Balakrishnan and Y. -s. Kee, "Crail-KV: A High-Performance Distributed Key-Value Store Leveraging Native KV-SSDs over NVMe-oF," 2018 IEEE 37th International Performance Computing and Communications Conference (IPCCC), Orlando, FL, USA, 2018.
Bill Martin; Samsung; John Kim, NVIDIA, "The Key to Value: Understanding the NVMe Key-Value Standard" SNIA, Sep. 1, 2020.

* cited by examiner

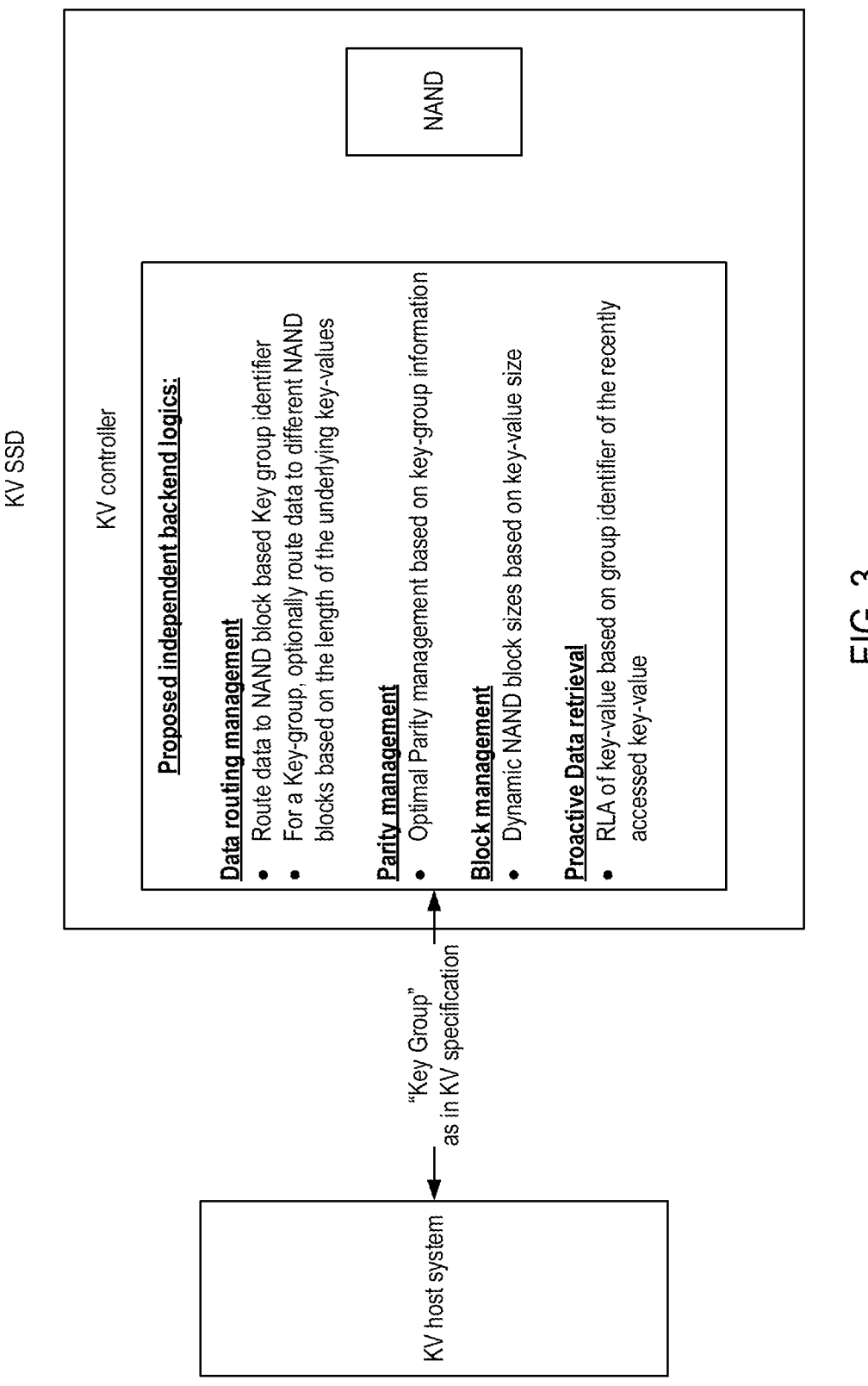

KV SSD

KV controller

Proposed independent backend logics:

Data routing management
- Route data to NAND block based Key group identifier
- For a Key-group, optionally route data to different NAND blocks based on the length of the underlying key-values

Parity management
- Optimal Parity management based on key-group information

Block management
- Dynamic NAND block sizes based on key-value size

Proactive Data retrieval
- RLA of key-value based on group identifier of the recently accessed key-value

NAND

"Key Group"
as in KV specification

KV host system

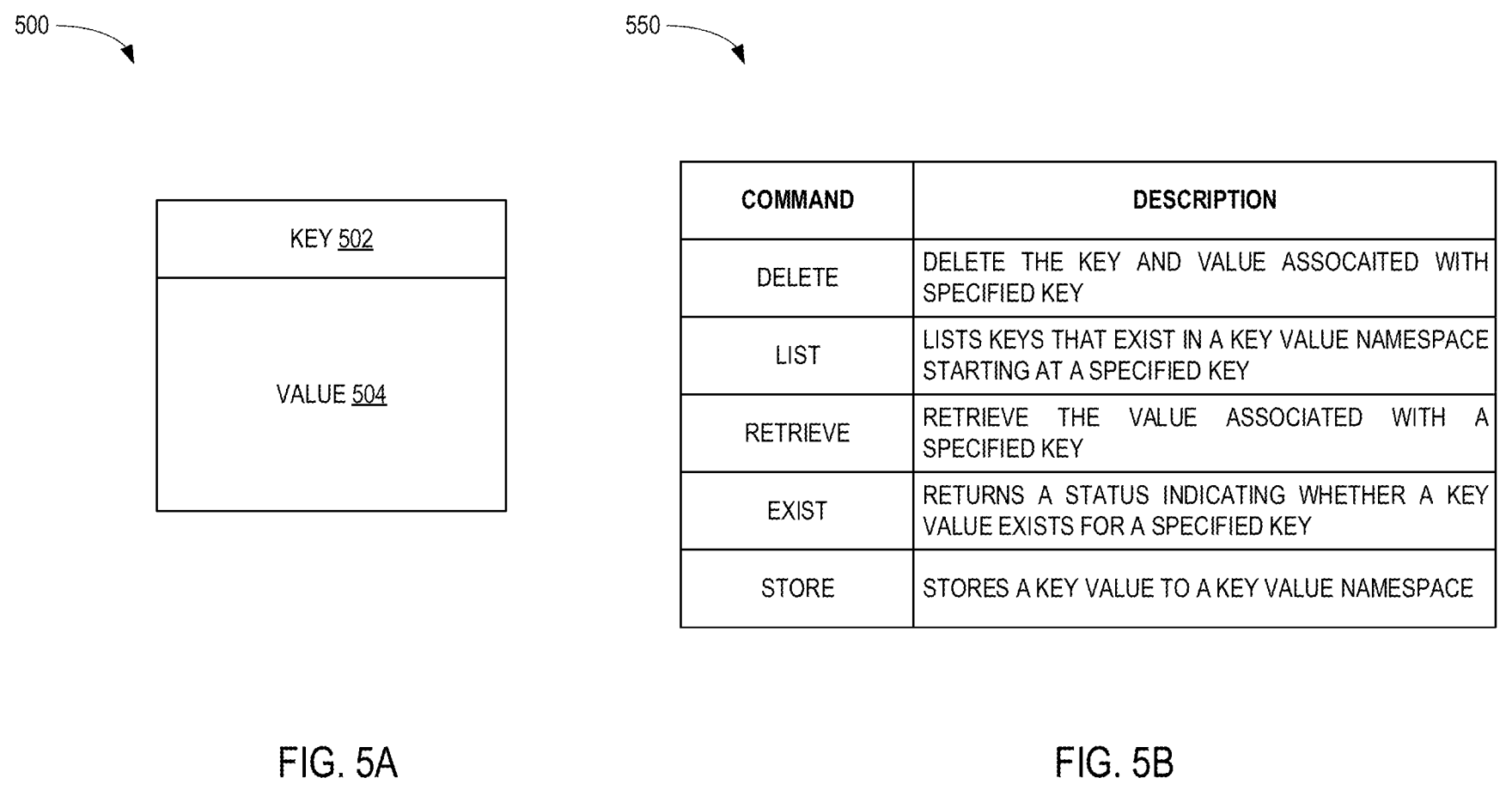

| COMMAND | DESCRIPTION |
|---------|-------------|
| DELETE | DELETE THE KEY AND VALUE ASSOCAITED WITH SPECIFIED KEY |
| LIST | LISTS KEYS THAT EXIST IN A KEY VALUE NAMESPACE STARTING AT A SPECIFIED KEY |
| RETRIEVE | RETRIEVE THE VALUE ASSOCIATED WITH A SPECIFIED KEY |
| EXIST | RETURNS A STATUS INDICATING WHETHER A KEY VALUE EXISTS FOR A SPECIFIED KEY |
| STORE | STORES A KEY VALUE TO A KEY VALUE NAMESPACE |

| KEY 502 |
|---------|
| VALUE 504 |

FIG. 5A

KEY-GROUP BASED DATA MANAGEMENT IN KV SSD

BACKGROUND OF THE DISCLOSURE

Field of the Disclosure

Embodiments of the present disclosure generally relate to improving key-group allocation in solid state drives (SSD).

Description of the Related Art

A key value (KV) system is a KV type of storage management. Instead of a block based logical block address (LBA) writes and reads, the data will be written in terms of value which is associated to a key. During data KV writes, the host writes the value with the key, so that the host can use the same key to retrieve the written value. For the particular key, the device will go and check which data is needed, and then the device will pull the data out and provide the data back to the host.

Using KV is more convenient for object type of storage. For example a video frame, an image, a clip of video stream, a video, a medical record etc. Any customization can be done using the KV. A value becomes a key, but the host has to provide the appropriate key for that value. Once the host provides the key for the value, then the data can be stored as a KV. Now that the data is stored as a KV, the KV can be retrieved henceforth.

A KV is aligned with the Non-Volatile Memory express (NVMe) KV command set. The KV provides synchronous and asynchronous functions. KV grouping is done in the user library. Currently, the KV has fixed length keys. KVs allows a portion of the key to be used to group keys together. Key-grouping utilizes trees to put keys into groups. Functions, such as lists within the group, are created and "delete entire group" is enabled.

There is a need in the art for improving key-group data management in SSDs.

SUMMARY OF THE DISCLOSURE

Instead of using trees to group key values (KV) based on KV information, use host provided information for grouping KVs. In the cases where the host provides KV information, the host determines how to group the information. The controller will then use the KV information to store the KV information in a group. The KVs can be sorted in the group by either size, length, type, etc. of the KV received from the host. Independent backend logic, such as data routing management, parity management, block management, and proactive data retrieval, is used to group KV information. Grouping the KV information using the independent backend logic will make garbage collection (GC) less difficult and increase retrieval performance due to the grouping of the KVs.

In one embodiment, a data storage device comprises: a memory device; and a controller coupled to the memory device, wherein the controller is configured to: receive a write command to write first data to the memory device, wherein the first data is part of a first key value (KV) group; write the first data to a first location in the memory device; receive a write command to write second data to the memory device, wherein the second data is part of the first KV group; and write the second data to the first location in the memory device.

In another embodiment, a data storage device comprises: a memory device; and a controller coupled to the memory device, wherein the controller is configured to: route key values (KVs) associated with keys into blocks of the memory device based upon KV group identifiers; and delete blocks of the memory device upon receiving a command to delete a KV group.

In another embodiment, a data storage device comprises: means to store data; and a controller coupled to the means to store data, wherein the controller is configured to: maintain different block sizes within the means to store data, wherein the different block sizes correspond to different key value (KV) lengths; and store data in the means to store data based upon KV group information.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 3 is a block diagram illustrating a system of a KV SSD with key-group defined data management and backend optimizations, according to one embodiment.

FIG. 5A is an exemplary illustration of a KV pair data, according to certain embodiments.

FIG. 5B is a table illustrating a command set for a KV database, according to certain embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Instead of using trees to group key values (KV) based on KV information, use host provided information for grouping KVs. In the cases where the host provides KV information, the host determines how to group the information. The controller will then use the KV information to store the KV information in a group. The KVs can be sorted in the group by either size, length, type, etc. of the KV received from the host. Independent backend logic, such as data routing management, parity management, block management, and proactive data retrieval, is used to group KV information. Grouping the KV information using the independent backend logic will make garbage collection (GC) less difficult and increase retrieval performance due to the grouping of the KVs.

Figure 1:
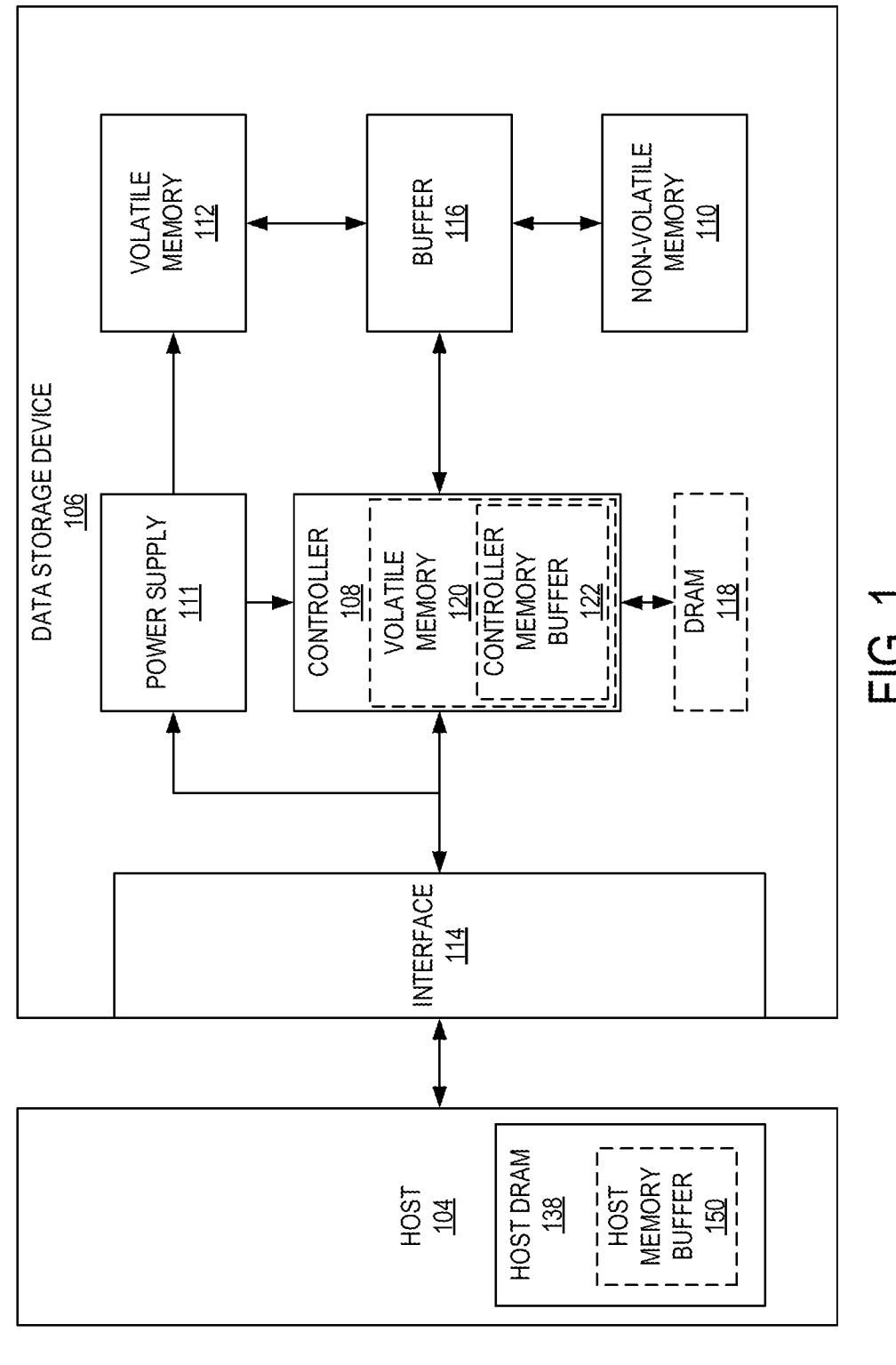
FIG. 1 is a schematic block diagram illustrating a storage system in which a data storage device may function as a storage device for a host device, according to certain embodiments.

FIG. 1 is a schematic block diagram illustrating a storage system 100 having a data storage device 106 that may function as a storage device for a host device 104, according to certain embodiments. For instance, the host device 104 may utilize a non-volatile memory (NVM) 110 included in data storage device 106 to store and retrieve data. The host device 104 comprises a host dynamic random access memory (DRAM) 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network-attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The host DRAM 138 may optionally include a host memory buffer (HMB) 150. The HMB 150 is a portion of the host DRAM 138 that is allocated to the data storage device 106 for exclusive use by a controller 108 of the data storage device 106. For example, the controller 108 may store mapping data, buffered commands, logical to physical (L2P) tables, metadata, and the like in the HMB 150. In other words, the HMB 150 may be used by the controller 108 to store data that would normally be stored in a volatile memory 112, a buffer 116, an internal memory of the controller 108, such as static random access memory (SRAM), and the like. In examples where the data storage device 106 does not include a DRAM (i.e., optional DRAM 118), the controller 108 may utilize the HMB 150 as the DRAM of the data storage device 106.

The data storage device 106 includes the controller 108, NVM 110, a power supply 111, volatile memory 112, the interface 114, a write buffer 116, and an optional DRAM 118. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106 or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe ×1, ×4, ×8, ×16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR-based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)). Likewise, the optional DRAM 118 may be utilized to store mapping data, buffered commands, logical to physical (L2P) tables, metadata, cached data, and the like in the optional DRAM 118. In some examples, the data storage device 106 does not include the optional DRAM 118, such that the data storage device 106 is DRAM-less. In other examples, the data storage device 106 includes the optional DRAM 118.

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110.

The controller 108 may include an optional second volatile memory 120. The optional second volatile memory 120 may be similar to the volatile memory 112. For example, the optional second volatile memory 120 may be SRAM. The controller 108 may allocate a portion of the optional second volatile memory to the host device 104 as controller memory buffer (CMB) 122. The CMB 122 may be accessed directly by the host device 104. For example, rather than maintaining one or more submission queues in the host device 104, the host device 104 may utilize the CMB 122 to store the one or more submission queues normally maintained in the host device 104. In other words, the host device 104 may generate commands and store the generated commands, with or without the associated data, in the CMB 122, where the controller 108 accesses the CMB 122 in order to retrieve the stored generated commands and/or associated data.

Figure 2:
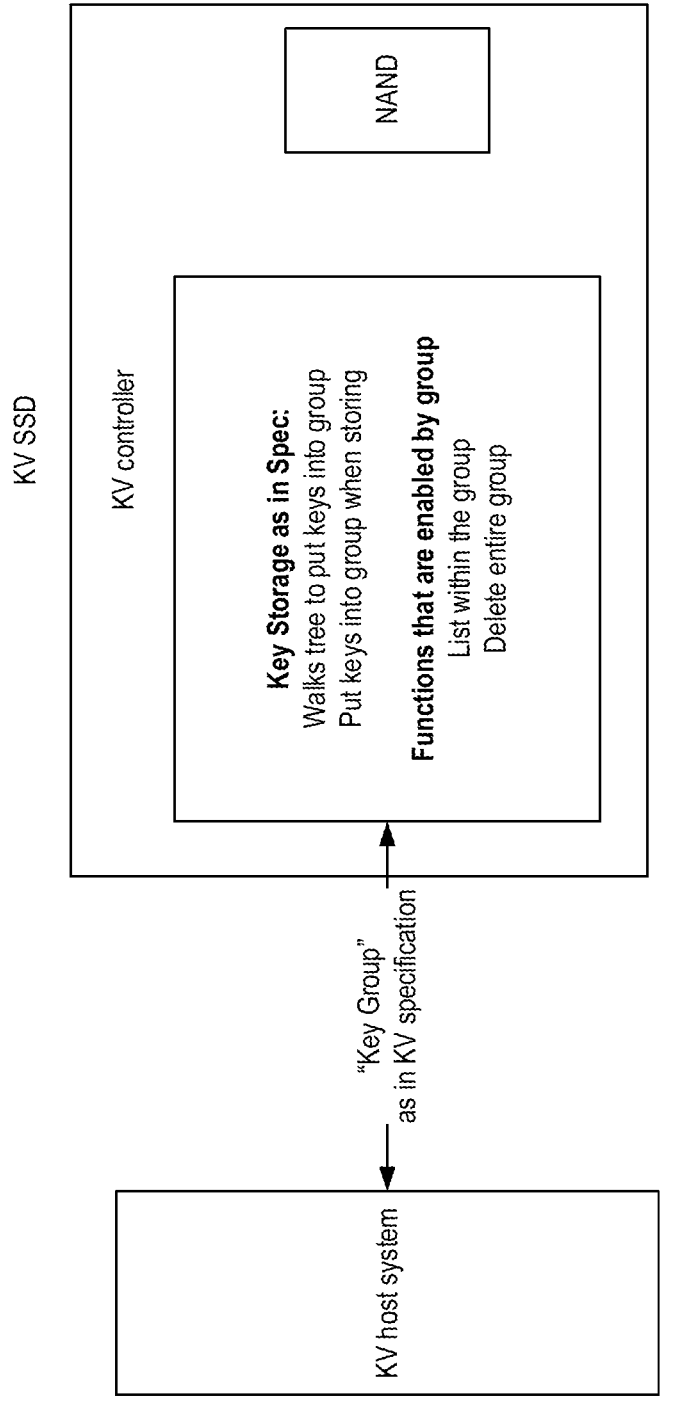
FIG. 2 is a block diagram illustrating a system of a KV SSD defined in KV specifications, according to one embodiment.

FIG. 2 is a block diagram illustrating a system 200 of a KV SSD defined in KV specifications, according to one embodiment. The system 200 comprises a KV host system and a KV controller. The KV host system communicates with the KV controller though a "key group". The KV controller further comprises key storage, functions and a NAND.

The KV specification suggests key grouping, wherein, when the KV host system creates a group. The key storage of the KV controller walks tree to put keys into a group. Keys are put into a group when storing. The specification further has functions that are enabled by the group such as list within the group and the ability to delete entire group.

As an example, the related keys can be associated to a sequence of video frames, or metadata counterparts which the host may be willing to group under one umbrella for easier key access management. The host has a mechanism to inform the device that a particular key is to be grouped under one group identifier and that the group may be listed or deleted together. However, group identifier does not mandate the value storage part of the group. A few device handling mechanisms in key group management can optimize the device performance, and specifically can increase the endurance of the flash cells as well as increase performance.

The KV device disclosed herein utilizes the key-grouping request, leverages that information to further manage its block policy wherein, it may have at least one open block mapped to a key group, and further routes the key-value associated to those keys into flash blocks based on the group's identifier.

In addition, or independently, the KV device may further have a mechanism, wherein a FW module would consider the length of the key-value that is requested to be grouped, and determine from the length whether the associated key-value should be routed into a storage block meant for larger key-value or smaller key-value based on the device thresholds. That is, the KV device will route smaller lengths of value to one block and bigger lengths of value to another block, both blocks being opened and associated to the same Key-group.

In another possibility, the KV device could determine an association of a key to an existing key-group through data parsing and route the value of such key based on such determination. For example, even if the host does not group the keys, the KV device can relate a set of video/audio frames (a frame may be stored via a key) from the embedded metadata in the header, given that the set of all the frames of a file may have a metadata about the video or the audio file.

The advantage in all the proposed methods is that key-value of a type (group-wise and/or based on length of key-value) are segregated by the device so that during data movement owing to flash management, enormous controller and NAND overhead can be reduced. For example, on a host command "Delete entire group", the KV device would be able to simply delete blocks associated with the key-group.

Similarly, on specific key delete requests (not involving group delete), the controller can logically delete key-values in a particular flash block (smaller key-value size) and many such possible specific deletes in the same block, not creating any dependency for larger key-value size by keeping them in a separate NAND block. This reduces overhead and improves device performance.

FIG. 3 is a block diagram illustrating a system 300 of a KV SSD with key-group defined data management and backend optimizations, according to one embodiment. The system 300 comprises a KV SSD that further comprises a KV host system and a KV controller. The KV controller further comprises independent backend logics and a NAND. The independent backend logic comprises data routing management, parity management, block management, and proactive data retrieval.

Using the parity management, a separate parity can be created to manage specific NAND blocks because the controller has decided to consolidate different data value segments into different blocks. Similarly, the controller can consolidate different parity also so that when the data has to be deleted the appropriate parity can easily be managed. When the data is deleted the controller does not want extra parity data deleted. So once the consolidation of the data is decided, the controller can also decide how the parity can be stored.

The controller can decide to store parity for some group of keys of parity for those values associated to some group of keys into some blocks and certain other group of keys, parity can be stored in another block. Now the parity is also segregated during the time of write and during delete. One set of parity can be let go of and another set of parity can be still maintained with that device. The garbage collection efforts for parity can now be reduced through.

Using block management, the KV controller may also create separate parity and manage accordingly in specific NAND blocks for the KV based on the key grouping information. That is, the KV controller can generate separate parity such that the KV controller can logically delete specific parity data when a specific set of keys are to be deleted or a key-group must be deleted. Creating separate parity keeps the overhead and resource associated to parity maintenance minimal in the KV SSD.

Using proactive data retrieval, the KV controller can receive a request for 120 KB of data. There will be a 0 KB to 120 KB and potentially the KV controller does some read look ahead (RLA). The KV controller speculates that now that the host has asked for 130 kilobytes of data, the host potentially is going to ask for the next 128 KB of data. The 0 KB to 128 KB is already asked for so the next 120 KB to 256 KB will potentially be asked for next. A typical storage device usually tries to read the data from the NAND. Since the NAND is the slower component, the kV controller tries to read the KVs size from the NAND ahead of time and store the KV size in a cache. Storing the KV size in the NAND allows for the KV to access the cache for the host requests. The read performance becomes fast because the controller reads the data from the NAND ahead of the host request. This is possible if the device knows what has to be read ahead of time in a block in a logical block address (LBA) based type of device.

The KV system does not have a concept of data sequence as in typical SSDs which have logical sequence. The keys are individual items representing the values for store and retrieval. So, in general, read look ahead (RLA) type of concept may not be applicable since there is no logical data concept, hence we propose to use the group identifier to leverage for proactive retrieval.

The KV controller may however use the information from the grouping request to link some of the values in the key-group during KV retrieval phase. For example, when a particular value is retrieved from a key "Key Retrieval", the controller may proactively fetch the values associated to keys in the Key group which may potentially get the retrieval request (next-in-line in key-group). Apart from the group information, the sequence of key additions to the group (during key store) also may be tracked to optimize the KV retrieval flow. It should be noted that using the tracking and the group information may help the proactive retrieval of value but may not be leak proof. In any case, the controller can learn from the hit/miss rate to course correct and in some cases do not perform proactive retrieval if the controller determines that the overhead is not properly put to good use.

Figure 4:
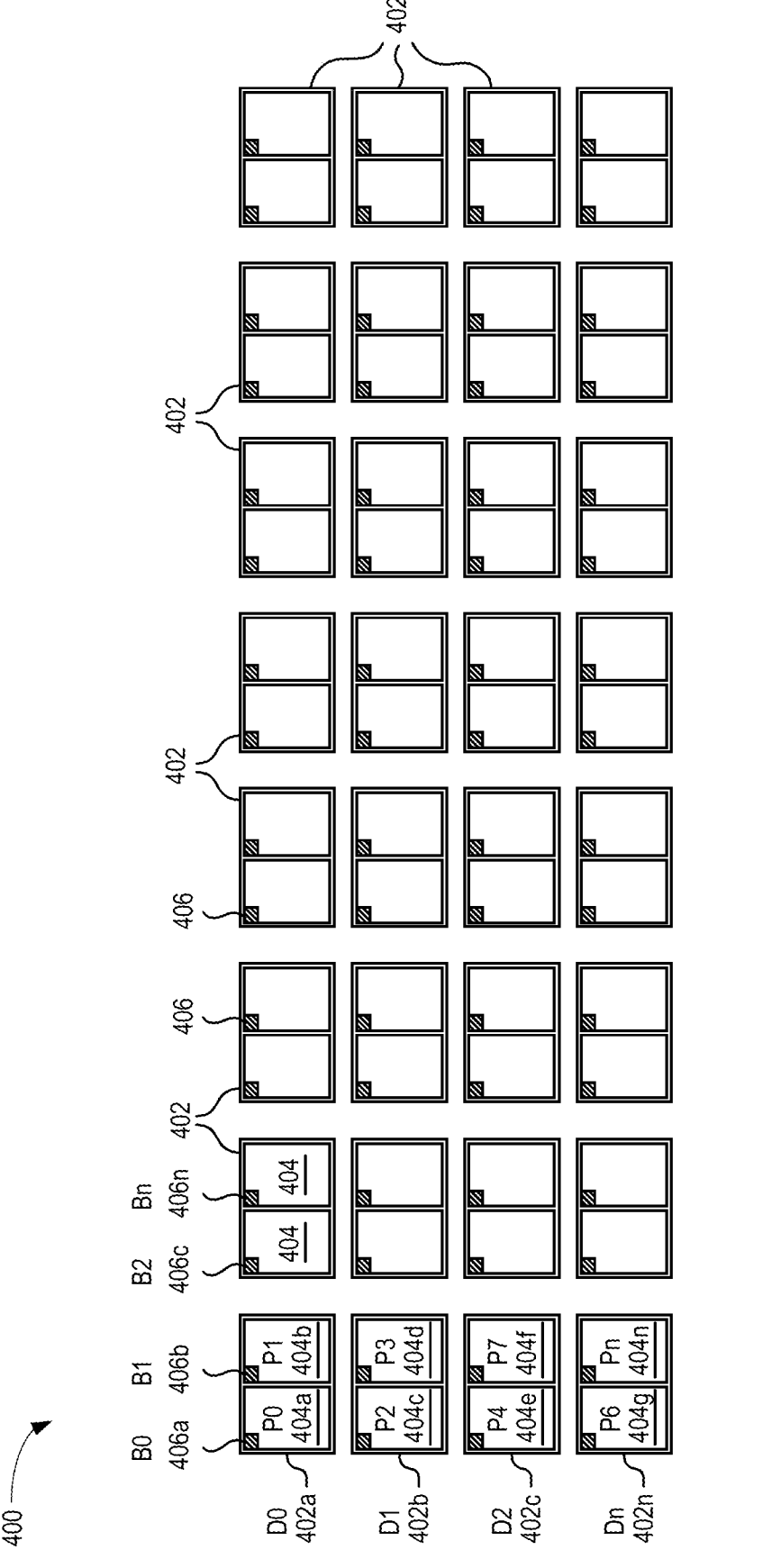
FIG. 4 is an illustration of a memory device, according to certain embodiments.

FIG. 4 is an illustration of a memory device 400, according to certain embodiments. Memory device 400 may be the NVM 110 of FIG. 1. The memory device 400 includes a plurality of dies 402a-402n, collectively referred to as dies 402, where each die of the plurality of dies 402a-402n includes a first plane 404a and a second plane 404b, collectively referred to as planes 404. Each of the planes 404 includes a plurality of blocks 406a-406n, collectively referred to as blocks 406. While 32 dies 402 are shown in the memory device 400, any number of dies may be included.

FIG. 5A is an exemplary illustration of a KV pair data 500, according to certain embodiments. KV pair data 500 includes a key 502 and a value 504, where the data, which may be host data, of the value 504 is addressed by the key 502. The key 502 may have a size of about 1 byte to about 64 bytes and the value 504 may have a size of about 0 bytes to about 232-1 bytes. For example, when the value 504 has a size of about 0 bytes, the value 504 is an empty value. It is to be understood that the previously mentioned values are not intended to be limiting, but to provide an example of an embodiment. Because the value 504 may have a size greater than a physical wordline (e.g., greater than 16 KB), the value 504 may be divided across several wordlines and may result in misalignment. Misalignment may occur when partial data from multiple values are stored in a single wordline or when a portion of the value 504 is stored partially on a single wordline. Because misalignment of stored data may result in multiple reads, quality of service of a data storage device storing the misaligned data may be decreased and power consumption of the data storage device may be increased.

FIG. 5B is a table 550 illustrating a command set for a KV database, according to certain embodiments. For exemplary purposes, aspects of the storage system 100 of FIG. 1 may be referenced herein. A KV system may include a command set that includes, in a non-limiting list, a delete command, a list command, a retrieve command, an exist command, and a store command. The delete command may cause the controller 108 to delete the key 502 and value 504 associated with the key 502. The list command may cause the controller 108 to list keys that exist in a KV namespace starting at a specified key. The exist command may cause the controller 108 to return a status indicating whether a KV pair data 500 exists for a specified key to the command generator, such as the host device 104. The store command may cause the controller 108 to store a KV pair data to a KV namespace.

The retrieve command may cause the controller 108 to retrieve the value 504 associated with a specified key from a KV namespace. The length to be retrieved of the KV pair data 500 is specified in the retrieve command and the location to transfer the KV pair data 300 is specified by either a scatter gather list (SGL) pointer or a physical region page (PRP) pointer in the retrieve command. If the specified length in the retrieve command is less than the length of the KV pair data 500 that is being retrieved, then the controller 108 returns the requested amount and the length of the KV pair data 500 to the completion queue. However, if the specified length in the retrieve command is greater than the length of the KV pair data 500 that is being retrieved, then the controller 108 returns the data from the NVM 110 and the length of the KV pair data 500 is returned to the completion queue.

Figure 6:
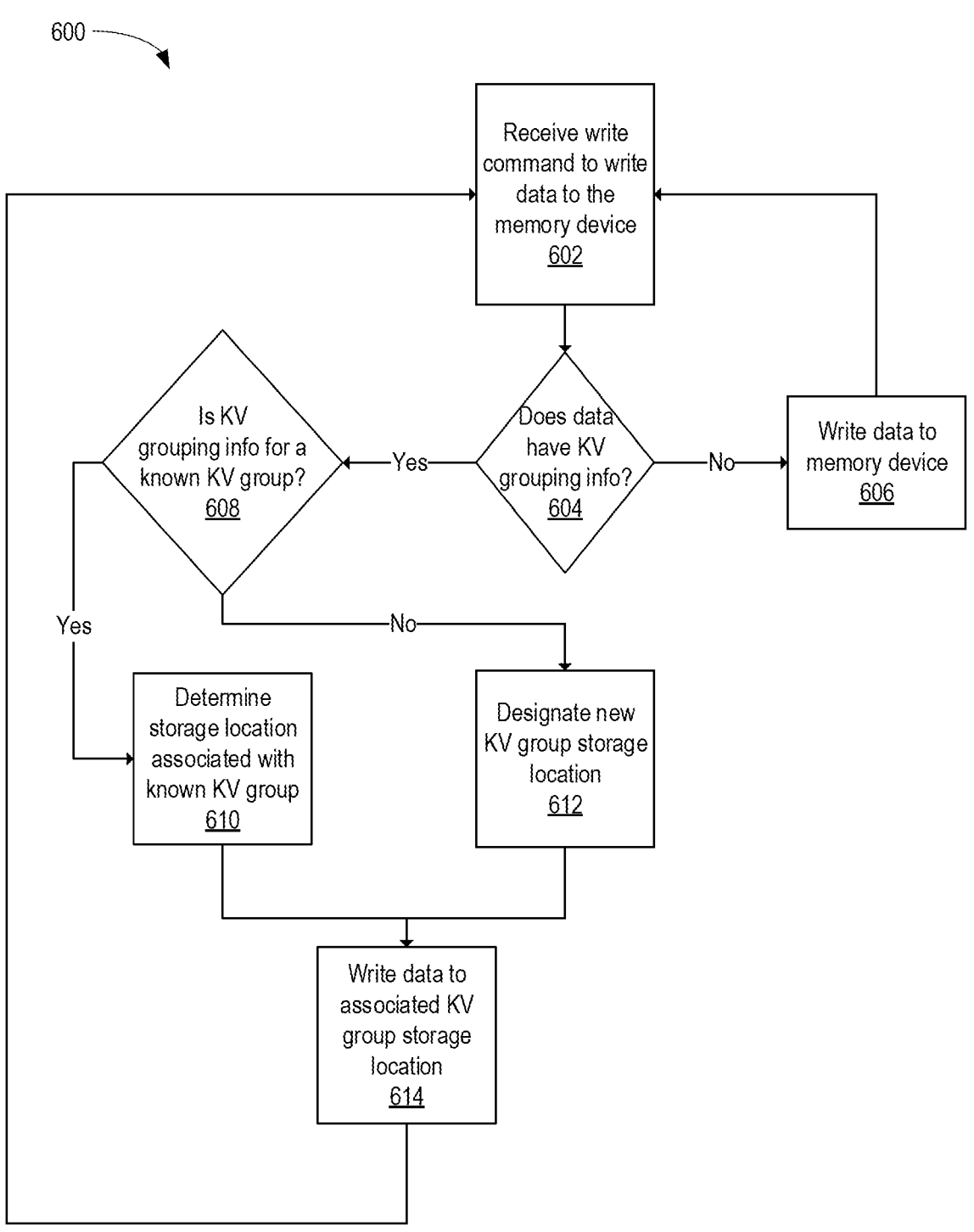
FIG. 6 is a flowchart illustrating a method for writing data associated to KV group storage location, according to certain embodiments.

FIG. 6 is a flowchart illustrating a method 600 for writing data associated to KV group storage location, according to certain embodiments. The KV controller may further maintain different NAND block sizes used for underlying storage based on KV lengths. Keys with smaller value length are routed to blocks of smaller size (less interleaved blocks, where performance is not impacted by smaller value sizes), and larger KV length to another set of blocks which are larger in size due to more interleaving (where block interleaving performance impact is there). The controller may also store the KV of a key into a physical block without interleaving if the key determines to segregate the key from rest of value storage.

The method 600 begins at block 602. At block 602, the controller receives a write command to write data to the memory device. At block 604, the controller determines whether the data has KV grouping information. If the controller determines that the data does not have KV grouping information, then the method 600 proceeds to block 606. At block 606, the controller writes data to the memory device, then the method 600 returns to block 602.

If the controller determines that the data does have KV grouping information, then the method 600 proceeds to block 608. At block 608, the controller determines whether the KV grouping information is for a known KV group. If the controller determines that the KV grouping information is for a known KV group, then the method 600 proceeds to block 610. At block 610, the controller determines the storage location associated with the known KV group, then the method 600 proceeds to block 614. If the controller determines that the KV grouping information is not for a known KV group, then the method 600 proceeds to block 612. At block 612, the controller designates a new KV group storage location, then the method 600 proceeds to block 614. At block 614, the controller writes data to the associated KV group storage location.

Figure 7:
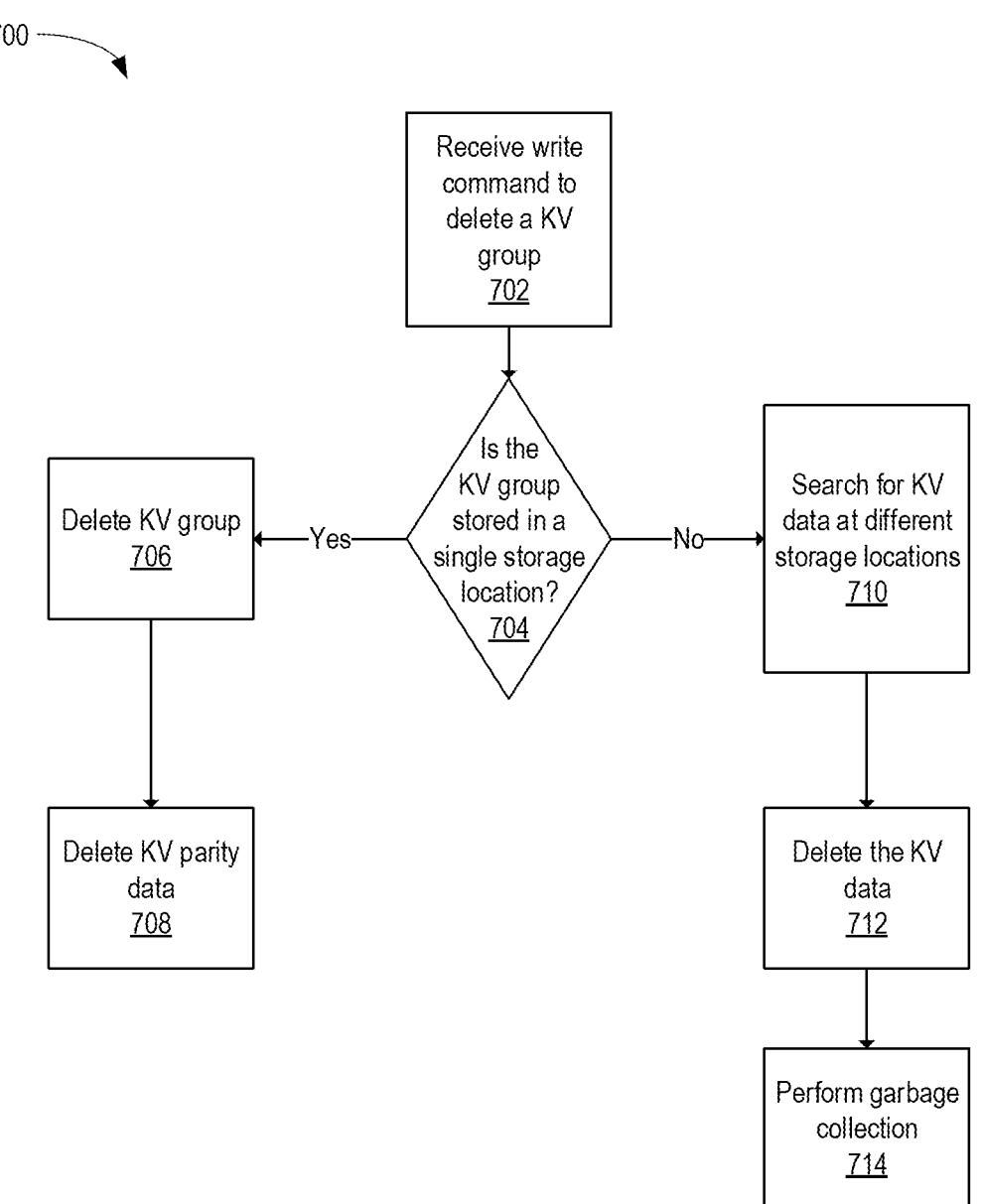
FIG. 7 is a flowchart illustrating a method for deleting a KV group, according to certain embodiments.

FIG. 7 is a flowchart illustrating a method 700 for deleting a KV group, according to certain embodiments. The advantage in all the proposed methods is that the KV type (group-wise and/or based on length of KV) are segregated by the device so that during data movement to the flash management, the controller and NAND overhead can be reduced. For example, on a host command "Delete entire group" as described, the KV SSD will be able to simply delete blocks associated to the key-group.

Similarly, on specific key delete requests (not involving group delete), the controller can logically delete KVs in a particular flash block (smaller KV size) and many specific deletes in the same block. By keeping a smaller KV size the specific deletes in a separate NAND block, the dependency for larger KV sizes is not created. The smaller KV size reduces overhead and improves device performance.

The method 700 begins at block 702. At block 702, the controller receives a write command to delete a KV group. At block 704, the controller determines whether the KV group is stored in a single storage location. If the controller determines that the KV group is stored in a single storage location, then the method 700 proceeds to block 706. At block 706, the controller deletes the KV group. At block 708, the controller deletes the KV parity data.

If the controller determines that the KV group is not stored in a single storage location, then the method 700 proceeds to block 710. At block 710, the controller searches for the KV data in different storage locations. At block 712, the controller deletes the KV data. At block 714, the controller performs garbage collection.

The advantage of key-grouping based on host KV reduces NAND overhead and efficient data management using KV size when grouping. Furthermore, backend modules leverages the host requests and improve performance without impacting the interface.

In one embodiment, a data storage device comprises: a memory device; and a controller coupled to the memory device, wherein the controller is configured to: receive a write command to write first data to the memory device, wherein the first data is part of a first key value (KV) group; write the first data to a first location in the memory device; receive a write command to write second data to the memory device, wherein the second data is part of the first KV group; and write the second data to the first location in the memory device. The controller is configured to: receive a write command to write third data to the memory device, wherein the third data is part of a second KV group; and write the third data to a second location separate and distinct from the first location. The first location and the second location are blocks. The controller is configured to parse the second data to determine the second data is part of the first KV group. The first location comprises: a first portion for storing data having a length that is below a first threshold; and a second portion for storing data having a length that is above the first threshold. The first portion and the second portion are each blocks that are part of a same metablock. The controller is configured to: receive a command to erase all data associated with the first KV group; and erase the first location. The controller is further configured to create parity data for the first location. The controller is configured to receive a command to erase the first KV group, and wherein the controller is configured to delete the parity data. The controller is configured to dynamically adjust block sizes within the memory device based upon KV group size. The controller is configured to pre-retrieve data from the memory device based upon a read request for data within a same KV group. The controller is configured to track additions to a KV group.

In another embodiment, a data storage device comprises: a memory device; and a controller coupled to the memory device, wherein the controller is configured to: route key values (KVs) associated with keys into blocks of the memory device based upon KV group identifiers; and delete blocks of the memory device upon receiving a command to delete a KV group. The controller is configured to determine an association of a key to an existing key group during data parsing and perform the routing. The controller is configured to relate a set of data and group the set of data as a KV group. The grouping is based upon embedded metadata of the set of data. The controller is configured to create parity on a block by block basis.

In another embodiment, a data storage device comprises: means to store data; and a controller coupled to the means to store data, wherein the controller is configured to: maintain different block sizes within the means to store data, wherein the different block sizes correspond to different key value (KV) lengths; and store data in the means to store data based upon KV group information. The maintaining comprises interleaving blocks for storing data of a same KV group. The controller is configured to: retrieve a first portion of data associated with a KV group after receiving a read command to read the first portion; and retrieve a second portion of data associated with the KV group in response to receiving the read command to read the first portion, wherein the retrieving the second portion occurs prior to receiving a read command to read the second portion.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
a memory device; and
a controller coupled to the memory device, wherein the controller is configured to:
  receive a write command to write first data to the memory device, wherein the first data has a first group identifier of a plurality of group identifiers;
  determine a first key value (KV) group of a plurality of KV groups is associated with the first group identifier, wherein each group identifier of the plurality of group identifiers is associated with a separate and distinct sequence of video/audio frames, and wherein parity of each KV group of the plurality of KV groups is generated, stored, and managed separately;
  write the first data to a first location in the memory device, wherein the first location is associated with the first KV group;
  receive a write command to write second data to the memory device;
  determine that the write command to write second data comprises the first group identifier;
  write the second data to the first location in the memory device;
  track a sequence of key additions to each KV group;
  receive a first read request for data within the first KV group;
  pre-retrieve data from the memory device based upon the first read request for data within the first KV group, wherein the pre-retrieval is further based on the sequence of key additions to the first KV group; and
  learn from a hit/miss rate of the pre-retrieved data to determine when to proactively pre-retrieve data.

2. The data storage device of claim 1, wherein the controller is configured to:

receive a write command to write third data to the memory device, wherein the third data has a second group identifier of the plurality of group identifiers; and
write the third data to a second location separate and distinct from the first location, wherein the second location is associated with a second KV group of the plurality of KV groups.

3. The data storage device of claim 2, wherein the first location and the second location are blocks.

4. The data storage device of claim 1, wherein the controller is configured to parse the second data to determine the second data is part of the first KV group.

5. The data storage device of claim 1, wherein the first location comprises:
a first portion for storing data having a length that is below a first threshold; and
a second portion for storing data having a length that is above the first threshold.

6. The data storage device of claim 5, wherein the first portion and the second portion are each blocks that are part of a same metablock.

7. The data storage device of claim 1, wherein the controller is configured to:
receive a command to erase all data associated with the first KV group; and
erase the first location.

8. The data storage device of claim 1, wherein the controller is further configured to create parity data associated with the first group identifier for the first location.

9. The data storage device of claim 8, wherein the controller is configured to receive a command to erase data having the first group identifier, and wherein the controller is configured to, upon receiving the command to erase data having the first group identifier, delete the parity data and data of the first KV group.

10. The data storage device of claim 1, wherein the controller is configured to dynamically adjust block sizes within the memory device based upon KV group size.

11. The data storage device of claim 1, wherein the controller is configured to pre-retrieve data from the memory device based upon a read request for data within a same KV group.

12. The data storage device of claim 11, wherein the pre-retrieval is further based on the sequence of key additions to the same KV group.

13. The data storage device of claim 1, wherein the controller is configured to learn from a hit/miss rate of the pre-retrieved data for each KV group to determine when to proactively pre-retrieve data.

14. The data storage device of claim 1, wherein the memory device comprises a cache, and wherein the pre-retrieved data read from a NAND-based flash memory device and stored in the cache.

15. The data storage device of claim 1, wherein the controller is further configured to:
receive a second read request for data within the first KV group; and
determine not to perform the proactive pre-retrieval of data associated with the second read request based on the learned hit/miss rate.

16. The data storage device of claim 15, wherein the controller determines not to preform the proactive pre-retrieval of data when the controller determines that an overhead of storage is not properly utilized.

17. The data storage device of claim 1, wherein the memory device comprises NAND-based flash memory devices.

* * * * *